Figure 1:
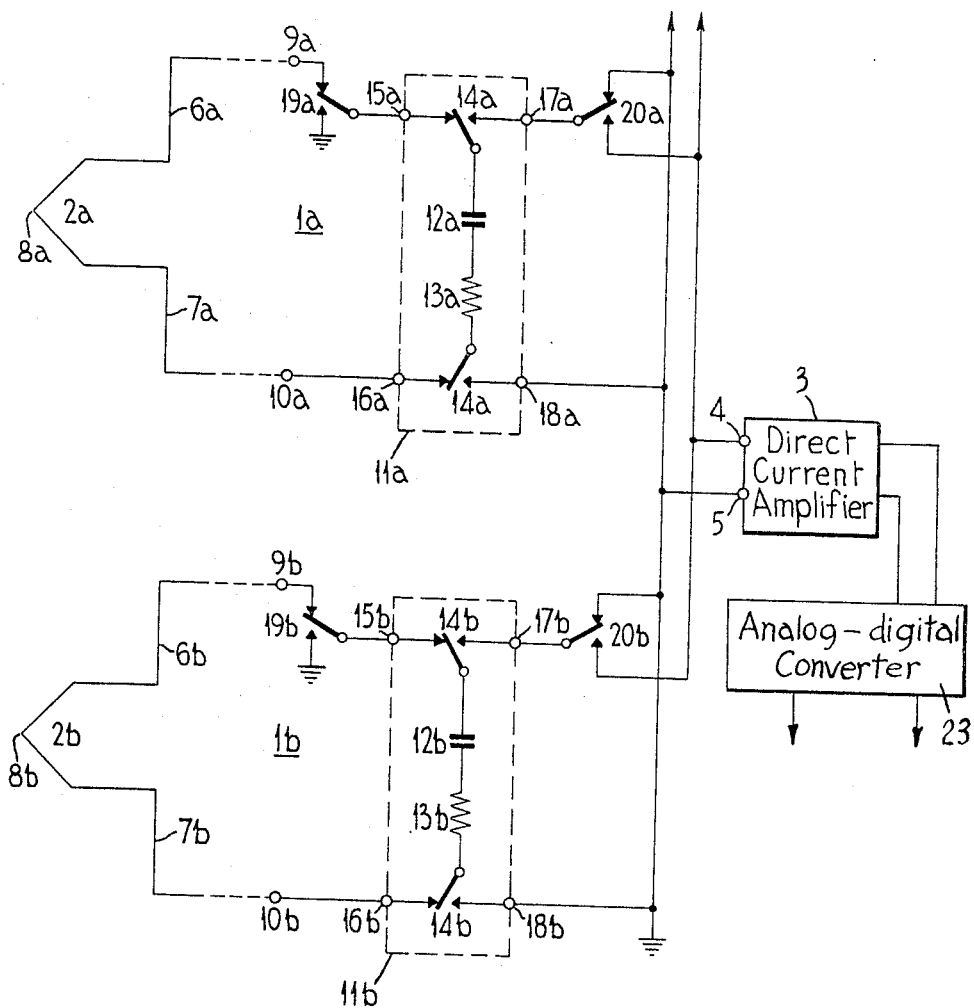

United States Patent Office 3,271,651
Patented Sept. 6, 1966

3,271,651
SIGNAL TRANSFER APPARATUS INCORPORATING MEANS TO SUPPRESS SPURIOUS INTERFERENCE SIGNALS
Pierre Diederich, Harpenden, England, assignor to International Systems Control Limited, Wembley, England
Filed Sept. 23, 1963, Ser. No. 310,797
Claims priority, application Great Britain, Sept. 24, 1962, 36,257/62
9 Claims. (Cl. 320—1)

This invention relates to electrical apparatus.

The invention is concerned in particular with electrical apparatus of the kind including a voltage generating means associated with a first pair of terminals between which a potential difference representing the output of the voltage generating means appears in operation, a voltage responsive means associated with a second pair of terminals between which the input to the voltage responsive means is arranged to be applied in operation, and means for applying between said second pair of terminals a potential difference which is a representation of the potential difference appearing at a particular instant in operation between said first pair of terminals.

In one example of an electrical apparatus of the kind specified, the voltage generating means may be an electrical measuring device (for example a thermocouple) designed to produce an output voltage which varies in accordance with any variations in the quantity measured, while the voltage responsive means may be a direct current amplifier which is arranged to amplify the potential difference applied between the second pair of terminals.

One difficulty which has been experienced hitherto with electrical apparatus of the kind specified is that spurious interference signals may be superimposed on the output of the voltage generating means so that the potential difference appearing in operation between said first pair of terminals is not a true representation of the output of the voltage generating means.

One form of interference which may be encountered in an electrical apparatus of the kind specified is so-called series mode interference which may give rise to a spurious alternating voltage (the frequency of which is normally equal to mains frequency or a harmonic thereof) superimposed on the output of the voltage generating means; such spurious alternating voltages may be produced by currents being induced in leads to said first pair of terminals due to the presence of stray electric or magnetic fields in the vicinity of such leads. Also, another form of interference which may be encountered in electrical apparatus of the kind specified is so-called common mode interference the effect of which is to impose a spurious biasing potential on each of the terminals of said first pair, the biasing potential being the same for each terminal; such a spurious potential may be produced due to stray capacitative coupling or direct leakage between leads to these terminals and a nearby potential source such as a local earth which is not at true earth potential.

According to one aspect of the invention, there is provided an electrical apparatus of the kind specified in which, in operation spurious alternating voltages are liable to be superimposed on the output of the voltage generating means, the apparatus including the series combination of a capacitative element and a resistive element, and switch means for selectively connecting said series combination between either said first pair of terminals or said second pair of terminals, the value of said resistive element being considerably greater than the value of the impedance of said capacitative element at a frequency corresponding to the frequency of any significant spurious alternating voltage which is liable to be superimposed in operation on the output of the voltage generating means.

It will be appreciated that this aspect of the invention enables the difficulty discussed above to be alleviated. Thus, in operation of an electrical apparatus in accordance with this aspect of the invention, when the switch means is in a condition such that said series combination is connected between said first pair of terminals any spurious alternating voltage which appears between said first pair of terminals is developed mainly across the resistive element, so that when the switch means is subsequently operated to connect said series combination between said second pair of terminals this spurious alternating voltage is largely eliminated since only the voltage appearing across the capacitative element is transferred to the input of the voltage responsive means. Also it will be appreciated that since only the potential difference appearing between the terminals of the capacitor can be directly transferred to said second pair of terminals, this aspect of the invention prevents any spurious biasing potential imposed on said first pair of terminals due to common mode interference being transferred to the input to said voltage by the capacitor responsive means.

Another difficulty which may be experienced with electrical apparatus of the kind specified in which a spurious biasing potential is liable to be imposed on said first pair of terminals and in which switch means is included for selectively connecting an impedance path comprising a capacitative element between either said first pair of terminals or said second pair of terminals, is that there may be a risk that such a spurious biasing potential may be applied to said second pair of terminals via stray capacitances associated with said switch means with, for example, consequent risk of overload conditions being set up in said voltage responsive means. It will be appreciated that such stray capacitances may give rise to two capacitative couplings between said first pair of terminals and said second pair of terminals, each terminal of said first pair being capacitatively coupled to the corresponding terminal of said second pair, that is to say to that one of the terminals of said second pair which is adapted to be connected to the same end of said impedance path as is the relevant terminal of said first pair.

According to a second aspect of the invention there is provided an electrical apparatus of the kind specified in which, in operation, a spurious biasing potential due to common mode interference is liable to be imposed on said first pair of terminals, the apparatus including an impedance path including a capacitative element, first switch means for selectively connecting said impedance path between either said first pair of terminals or said second pair of terminals, and second switch means whereby, when said impedance path is connected between said second pair of terminals, one of the first pair of terminals and the one of the second pair of terminals corresponding to said other one of the first pair of terminals are each connected to a point maintained at a reference potential.

It will be appreciated that this second aspect of the invention enables the last mentioned difficulty to be alleviated. Thus, when said impedance path is connected between said second pair of terminals, one or the other of the terminal points of any capacitative coupling (as described above) is substantially always maintained at a reference potential; hence no spurious biasing potential can appear on the terminals of said second pair.

In a particular arrangement according to the second aspect of the invention, there is provided an electrical apparatus of the kind specified in which, in operation, a spurious biasing potential due to common mode interference is liable to be imposed on said first pair of terminals, the apparatus including an impedance path including a capacitative element, first switch means for selectively connecting said impedance path between either said first pair of terminals or said second pair of terminals, and second switch means which is operable in conjunction with said first switch means in such a manner that, when said second switch means is in one condition (corresponding to said impedance path being connected between said first pair of terminals), the terminals of said second pair are each connected to a point which is maintained at a reference potential, and that, when said second switch means is in another condition (corresponding to said impedance path being connected between said second pair of terminals), one only of the terminals of said second pair is disconnected from the relevant reference potential, while that one of said first pair of terminals corresponding to said one of the terminals of said second pair is connected to a point which is maintained at a reference potential.

This particular arrangement finds especial application where a number of apparatuses of the kind specified are to be used together sharing a single voltage responsive means. In operation, the first switch means of the various apparatuses may be operated in turn thereby applying to the voltage responsive means a potential difference representing the output voltage of each voltage generating means.

Figure 2:
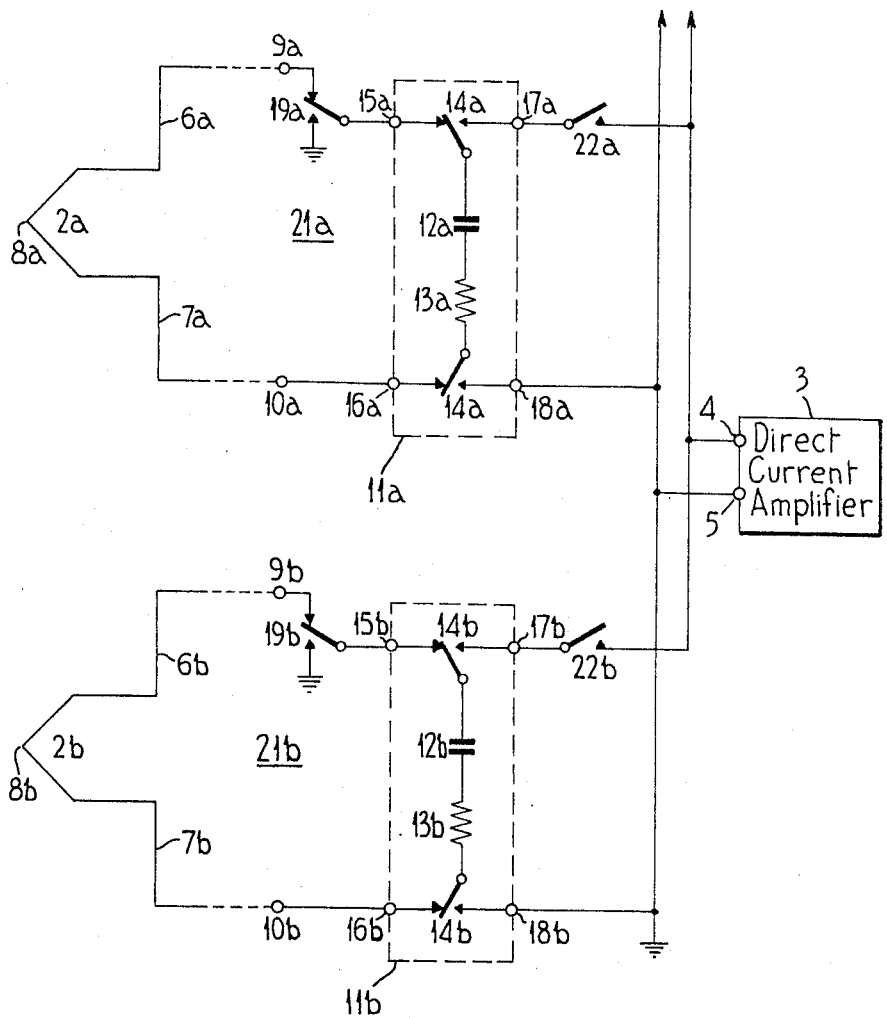

Two arrangements in accordance with the invention will now be described, by way of example, with reference to the accompanying drawings in which FIGURES 1 and 2 are respectively circuit diagrams illustrating the two arrangements. Each arrangement is adapted to form part of an automatic control system for an industrial plant and comprises a large number of apparatuses of the kind specified.

Referring now to FIGURE 1, in the first arrangement to be described the various apparatuses are all identical and only two of the apparatus 1a and 1b are therefore shown. For convenience only one apparatus 1a will be described in detail and the same reference numerals with respective suffixes "a" and "b" will be used for corresponding elements in the two apparatus 1a and 1b.

The voltage generating means of the apparatus 1a is constituted by a thermocouple 2a while the voltage responsive means, which is shared by all the apparatuses 1a, 1b etc., is constituted by a direct current amplifier 3 having two input terminals 4 and 5. The industrial plant (not shown) may, for example, be a steam generating plant, while the control system may employ a digital computer (not shown) arranged to control automatically the operation of the steam generating plant; in this case each thermocouple 2 could be used to provide a measure of the temperature of a different part of the plant, while the output of the amplifier 3 could be fed to an analog-digital converter 23 which is adapted to translate this output into digital form suitable for feeding to the computer.

The thermocouple 2a is of conventional design and comprises two wires 6a and 7a of suitable dissimilar metals (such as copper and constantan) ends of which are joined together to form the hot junction 8a of the thermocouple 1. The hot junction 8a is disposed adjacent the member whose temperature is to be measured, and the wires 6a and 7a are led away from the hot junction 7 into a control room where their ends are respectively connected to terminals 9a and 10a which are maintained accurately at the same constant temperature. It will be appreciated that the control room may be a considerable distance from the plant, and in this specific case the wires 6a and 7a are several hundreds of feet in length.

Also housed in the control room are the direct current amplifier 3 and transfer means 11a for applying periodically to the amplifier terminals 4 and 5 a voltage which is an instantaneous representation of the output of the thermocouple 1a.

The transfer means 11a includes the series combination of a capacitor 12a and a resistor 13a. The value of the resistor 13a is chosen to be considerably greater than the resistances of the wires 6a and 7a, and is also chosen to be considerably greater than the impedance of the capacitor 12a at a frequency equal to the frequency of the mains (50 cycles/second). The series combination of the capacitor 12a and resistor 13a is selectively connectable by means of contacts 14a of a first relay between either a pair of terminals 15a and 16a associated with the thermocouple terminals 9a and 10a, or another pair of terminals 17a and 18a associated with the amplifier terminals 4 and 5; the arrangement is such that when the first relay is in its non-operated condition the series combination is connected between the terminals 15a and 16a, and that when the first relay is operated the series combination is connected between the terminals 17a and 18a.

The terminal 16a is directly connected to the thermocouple terminal 10a, while the terminal 15a is connectable by means of contacts 19a of a second relay to either the other thermocouple terminal 9a or earth. The terminal 18a is directly connected to the amplifier terminal 5 (this amplifier terminal 5 being connected to earth), while the terminal 17a is connectable by means of contacts 20a of the second relay to either earth or the amplifier terminal 4. The arrangement is such that when the second relay is in a non-operated condition the terminals 15a and 16a are respectively directly connected to the thermocouple terminals 9a and 10a while the terminals 17a and 18a are each connected to earth, and that when the second relay is operated the terminal 15a is connected to earth instead of to the thermocouple terminal 9a while the terminals 17a and 18a are respectively directly connected to the amplifier terminals 4 and 5. In FIGURE 1 the contacts 14a, 19a and 20a are shown in positions corresponding to the non-operated conditions of the relays. It should be understood that, when the the second relay is in its non-operated condition, neither of the terminals 15a and 16a is directely connected to earth or any other reference potential source; this state of affairs is in essential requirement since the hot junction 8a of the thermocouple 2a may be directly connected to earth (for example it may be in direct contact with the metal wall of a boiler drum). In this connection it is pointed out that the relays employed should be such that, in respect of each make and break contact, the break is effected before the make.

The operation of the arrangement will now be described and explained. In view of the length of the leads 6 and 7, there is a considerable risk that both series mode and common mode interference may be experienced in operation. Such series mode interference is caused by spurious alternating currents being induced in the wires 6 and 7 (the frequency of any such alternating current being equal to the frequency of the mains or a multiple thereof), and spurious alternating voltages will thereby be superimposed on the output of each of the thermocouples 2. The effect of any common mode interference is to cause a spurious biasing potential to be imposed on each pair of thermocouple terminals 9 and 10. Such a spurious biasing potential may be high compared with the true output voltage of a thermocouple 2; for example, a spurious potential may be as high as 10 volts, whereas typically the true output voltage of a thermocouple 2 may be only of the order of 10 millivolts. As will be made clear later the transfer means 11 are so designed that the voltage applied periodically by each apparatus 1 between the amplifier terminals 4 and 5 is free of any spurious voltages due to either series mode or common mode interference.

The cycle of operation of each apparatus 1 will now be described with reference to apparatus 1a. Normally, both relays are in their non-operated condition so that the capacitor 12a is charged by the thermocouple 2a, the potential difference appearing between the terminals of the capacitor 12a being a true representation of the output of the thermocouple 2a; it will be appreciated that any spurious alternating voltage appearing between the thermocouple terminals 9a and 10a will be developed substantially wholly across the resistor 13a and so will not appear across the capacitor 12a. The values of the capacitor 12a and the resistor 13a are so chosen that the charge on the capacitor 12 can follow changes in the output of the thermocouple 2a, so that during the period for which the relays are in their non-operated condition the potential difference appearing between the terminals of the capacitor 12a will vary in accordance with any variation in the temperature being measured. The relays remain in their non-operated conditions for a predetermined period (which typically may be about 3 seconds) and then are both operated substantially simultaneously. Upon the relays being operated, the potential difference appearing between the terminals of the capacitor 12a is applied between the amplifier terminals 4 and 5 so that the amplifier 3 produces an output voltage which is an instantaneous indication of the temperature being measured by the thermocouple 2a. The relays remain operated for a period of about 20 milliseconds, and are then returned to their non-operated conditions, again substantially simultaneously. The cycle of operation is then repeated.

The cycles of operation of the apparatuses 1 are so phased that the amplifier 3 produces, in turn, output voltages which are respectively instantaneous indications of the temperatures being measured by the thermocouples 2.

The manner in which any spurious biasing potentials appearing on the thermocouple terminals 9 and 10 of any apparatus are prevented from being transferred to the amplifier terminals 4 and 5 will now be described with reference to apparatus 1a.

The contacts 14a have stray capacitances associated with them, so that, whatever condition the first relay is in, there is a certain amount of stray capacitative coupling between each terminal 15a and 16a and the corresponding terminal 17a or 18a. Transference of spurious potentials to the amplifier terminals 4 and 5 via these capacitative couplings is, however, prevented owing to the fact that, except momentarily during operation of the second relay, one of the terminal points of each coupling is earth. Thus, when the series combination of capacitor 12a and resistor 13a is connected between the terminals 17a and 18a, the terminal 18a is earthed and the terminal 15a is earthed via contacts 19a, so preventing the amplifier 3 giving a false indication of the temperature being measured by thermocouple 2a due to spurious biasing potentials at the thermocouples terminals 9a and 10a. Similarly, when the series combination of components 12a and 13a is connected between terminals 15a and 16a, the terminal 18a is earthed and the terminal 17a is earthed via contacts 20a, so preventing the amplifier 3 giving a false indication of the temperature being measured by the thermocouple 2 of any other apparatus 1b etc., due to spurious biasing potentials at the thermocouple terminals 9a and 10a.

It will be appreciated that, in view of the fact that in operation of the arrangement described above, no spurious potential due to common mode interference is applied to either of the amplifier terminals 4 and 5, a direct current amplifier having just two input terminals can be used as the voltage responsive device of the apparatus. It will be appreciated that, if spurious potentials were liable to be imposed in operation on the terminals 17 and 18 of any apparatus 1, then a differential amplifier having at least three input terminals would have to be used instead of the amplifier referred to above. Moreover, since no differential amplifier operates perfectly, any spurious common mode potentials might still cause the amplifier to produce output voltages which are erroneous indications of the temperatures measured.

It will be noted that the presence of the high valued resistor 13 in series with each capacitor 12 obviates the necessity of ensuring that the two relays in each apparatus 1 operate in exact synchronism; thus, even if the first relay were to operate slightly before the second relay thereby momentarily short circuiting the terminals 17 and 18, the presence of the resistor 13 would prevent any appreciable discharging of the capacitor 12.

In an arrangement similar to that described with reference to FIGURE 1 but including only one apparatus (say 1a), the contacts 20a of the second relay may be omitted, the terminal 17a being directly connected to the amplifier terminal 4. Any spurious biasing potential at the thermocouple terminals 9a and 10a will then, of course, appear at the amplifier terminals 4 and 5 when the series combination of components 12a and 13a is connected between terminals 15a and 16a; however, since the amplifier 3 does not then amplify voltages representing the outputs of other thermocouples, this will not matter. In the remote possibility that the spurious biasing potentials were large enough to damage the amplifier 3 permanently, it would, of course, be desirable to include the contacts 20a in an arrangement as shown in FIGURE 1, but including only one apparatus 1.

Referring now to FIGURE 2 of the drawings, in the second arrangement to be described the various apparatus 21 are again identical, and only two apparatuses 21a and 21b are therefore shown, suffixes "a and b" being used to differentiate between corresponding elements in the two apparatuses 21a and 21b. The major part of each apparatus 21 is structurally identical with the apparatuses 1 shown in FIGURE 1. For convenience, therefore, the same reference numerals will be used for corresponding elements in FIGURES 1 and 2, and only the difference between an apparatus 21 and an apparatus 1 will be described.

In each apparatus 21 the contacts 20 of the second relay are omitted and the terminal 17 is connected to the amplifier terminal 4 via a make contact 22 of a third relay. In operation of the arrangement, all the first and second relays are operated simultaneously at an instant at which it is desired to investigate the temperatures which the thermocouples 2 are measuring. The third relays are then operated in sequence so that the amplifier 3 gives an indication of the temperature measured by each thermocouple 2 in turn.

Elimination of series mode interference at the ampliger terminals 4 and 5 is effected in the same manner as described above with reference to FIGURE 1, but the manner in which common mode interference is eliminated is slightly different. Thus, in this arrangement, transference of spurious biasing potentials to the amplifier terminals 4 and 5 via the stray capacitative couplings between any terminal 15 or 16 and the corresponding terminal 17 or 18 is prevented by virtue of the fact that, while the temperatures are being measured, each terminal 18 is earthed directly and each terminal 15 is earthed via the corresponding relay contact 19.

It will be noted that, when the first and second relays are not operated, that is, when the amplifier 3 is not indicating the temperatures being measured, common mode interference from each apparatus 21 is applied to the amplifier terminals 4 and 5. However, since in the particular apparatus described common mode interference voltages are not large enough to damage the amplifier 3, this does not matter.

In one specific example of the arrangements described above, the resistances of the wires 6 and 7 are respectively 10 ohms and 100 ohms, the value of each capacitor 12 is 1 microfarad and the value of each resistor 13 is 33,000 ohms. It will be appreciated that at mains frequency the impedance of each capacitor 12 is only of the order of 3000 ohms so that the component of any spurious alternating voltage developed across the capacitor 12 is strongly attenuated. Further, it will be appreciated that the impedance of each capacitor 12 at a frequency equal to a harmonic of mains frequency will be even less than the value of the impedance quoted above.

What I claim is:

1. A signal transfer apparatus for applying to a voltage responsive means a potential difference representative of the output of a voltage generating means, said apparatus comprising:
- (A) a first pair of terminals to which is applied said potential difference representative of the output of the voltage generating means;
- (B) a second pair of terminals between which the voltage responsive means is connected;
- (C) an impedance path; and
- (D) a switch means having a set of contacts which, in a first condition of the switch means, serves to connect said impedance path between the first pair of terminals, and in a second condition of the switch means, serves to connect said impedance path between the second pair of terminals;
- (E) the impedance path comprising
  - (I) a capacitative element and
  - (II) a resistive element
  - (III) connected in series,
  - (IV) the resistive element having an impedance which is high compared with the impedance of the capacitative element at mains frequencies,
  - (V) whereby alternating components of the potential appearing between the first pair of terminals when the switch means is in its first condition are developed substantially wholly across said resistive element.

2. A signal transfer arrangement comprising:
- (A) a plurality of voltage generating means;
- (B) a common voltage responsive means;
- (C) a plurality of first pairs of terminals;
- (D) means for applying a potential difference representative of the output of a different one of the voltage generating means to each of said first pairs of terminals;
- (E) a plurality of second pairs of terminals;
- (F) means for selectively connecting said voltage responsive means to said second pairs of terminals; and
- (G) a plurality of signal transfer circuits, each transfer circuit comprising:
  - (I) an impedance path; and
  - (II) a switch means having a set of contacts which in a first condition of the switch means serves to connect the impedance path between a respective one of the first pairs of terminals, and in a second condition of the switch means serves to connect the impedance path between a respective one of the second pairs of terminals,
  - (III) the impedance path comprising
    - (a) a capacitataive element and
    - (b) a resistive element
    - (c) connected in series,
    - (d) the resistive element having an impedance which is high compared with the impedance of the capacitative element at mains frequencies,
    - (e) whereby alternating components of the potential appearing between the associated one of the first pairs of terminals when the switch means is in its first condition are developed substantially wholly across said resistive element.

3. An arrangement according to claim 2 wherein said voltage responsive means comprises a direct current amplifier.

4. An arrangement according to claim 2 wherein said voltage responsive means incorporates an analogue-to-digital converter.

5. A signal transfer apparatus for applying to a voltage responsive means a potential difference representative of the output of a voltage generating means, said apparatus comprising:

- (A) a first pair of terminals to which is applied said potential difference representative of the output of the voltage generating means;
- (B) a second pair of terminals between which the voltage responsive means is connected;
- (C) an impedance path including a capacitative element; and
- (D) a first switch means having a set of contacts which, in a first condition of the switch means serves to connect said impedance path between the first pair of terminals, and in a second condition of said switch means, serves to connect said impedance path between the second pair of terminals,
  - (I) said set of contacts providing stray capacitances between the first pair of terminals and the second pair of terminals, and
- (E) a second switch means having a set of contacts which serves to connect one of said first pair of terminals to a point of fixed potential when said first switch means is in its second condition and to disconnect said one of the first pair of terminals from said point when said first switch means is in its first condition; and
- (F) means connecting the one of the second pair of terminals corresponding to the other of said first pair of terminals to a point of fixed potential when said first switch means is in its second condition,
- (G) whereby one end of each stray capacitance is maintained at a fixed potential at least when the first switch means is in its second condition.

6. An apparatus according to claim 5, wherein said set of contacts of said second switch means serves, when the first switch means is in its second condition, to disconnect the voltage generating means from said one of said first pair of terminals.

7. An electrical apparatus according to claim 6, wherein the voltage generating means is a thermocouple.

8. A signal transfer apparatus according to claim 5, wherein the impedance path includes a resistive element in series with the capacitative element, the resistive element having an impedance which is high compared with the impedance of the capacitative element at mains frequencies, whereby alternating components of the potential appearing between the first pair of terminals when the first switch means is in its first condition are developed substantially wholly across said resistive element.

9. An apparatus according to claim 5 wherein said set of contacts of said second switch means further serves to connect the other of said second pair of terminals corresponding to the one of the first pair of terminals to a point of fixed potential when said first switch means is in its first condition and to disconnect said other of the second pair of terminals from said point when said first switch is in its second condition and said one of the second pair of terminals corresponding to the other of said first pair of terminals is permanently connected to a point of fixed potential, whereby one end of each stray capacitance is connected to a point of fixed potential in both conditions of said first switch means.

References Cited by the Examiner

UNITED STATES PATENTS

| | | | |
|---|---|---|---|
| 2,889,470 | 6/1959 | Gray et al. | 307—108 |
| 2,907,902 | 10/1959 | McIntosh et al. | 307—149 |
| 3,059,220 | 10/1962 | Dimeff | 340—147 |

BERNARD KONICK, *Primary Examiner.*

IRVING SRAGOW, *Examiner.*

J. F. BREIMAYER, *Assistant Examiner.*